United States Patent  
Miyata (10) Patent No.: US 10,252,372 B2
(45) Date of Patent: Apr. 9, 2019

(54) LASER CUTTING APPARATUS THAT PERFORMS GAP SENSOR CALIBRATION AND REFLECTED LIGHT PROFILE MEASUREMENT, AND CORRELATION TABLE GENERATION METHOD FOR LASER CUTTING APPARATUS

(71) Applicant: FANUC CORPORATION, Yamanashi (JP)

(72) Inventor: Ryusuke Miyata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 22 days.

(21) Appl. No.: 15/456,742

(22) Filed: Mar. 13, 2017

(65) Prior Publication Data

US 2017/0282293 A1 Oct. 5, 2017

(30) Foreign Application Priority Data

Mar. 29, 2016 (JP) ................................. 2016-066592

(51) Int. Cl.
*B23K 26/03* (2006.01)
*B23K 26/04* (2014.01)
*B23K 26/38* (2014.01)

(52) U.S. Cl.
CPC .......... *B23K 26/032* (2013.01); *B23K 26/048* (2013.01); *B23K 26/38* (2013.01)

(58) Field of Classification Search
CPC ................................ B23K 26/032; B23K 26/048
See application file for complete search history.

(56) References Cited

U.S. PATENT DOCUMENTS 5,883,356 A * 3/1999 Bauer ................ B23K 26/032
                                                                219/121.62
2017/0232558 A1* 8/2017 Kano ..................... B23K 26/14
                                                                219/121.72

FOREIGN PATENT DOCUMENTS

JP          H04-111987 A        4/1992
JP          H11-129084 A        5/1999

(Continued)

OTHER PUBLICATIONS

An Office Action issued by the Japanese Patent Office dated Jan. 23, 2018, which corresponds to Japanese Patent Application No. 2016-066592 and is related to U.S. Appl. No. 15/456,742; with English translation.

(Continued)

*Primary Examiner* — Georgia Y Epps
*Assistant Examiner* — Don J Williams
(74) *Attorney, Agent, or Firm* — Studebaker & Brackett PC (57) ABSTRACT

A laser cutting apparatus includes a laser oscillator; an output control unit for a laser beam; a cutting head configured to emit the laser beam; a gap sensor; an axial mechanism configured to activate the cutting head; an axial control unit; a detection unit configured to detect reflected light intensity; a storage unit configured to store an output value of the laser beam, reflected light intensity, a detection value of the gap sensor, and positional information of the axial mechanism; and a correlation table generation unit configured to output an instruction to operate the axial mechanism and the laser oscillator, and generates a correlation table configured to obtain a correlation between the output value of the laser beam and the reflected light intensity, a correlation between the positional information and the reflected (Continued)

light intensity, and a correlation between the detection value and the positional information.

7 Claims, 8 Drawing Sheets

(56)  References Cited

FOREIGN PATENT DOCUMENTS

| | | |
|---|---|---|
| JP | 2004-001067 A | 1/2004 |
| JP | 3520631 B2 | 2/2004 |
| JP | 2007-330981 A | 12/2007 |
| JP | 2008-110389 A | 5/2008 |
| JP | 2010-207819 A | 9/2010 |
| JP | 2011-204913 A | 10/2011 |
| JP | 5142252 B2 | 11/2012 |
| JP | 2015-104736 A | 6/2015 |
| JP | 5868559 B1 | 2/2016 |
| JP | 2016-036841 A | 3/2016 |
| JP | 2016-139726 A | 8/2016 |

OTHER PUBLICATIONS

An Office Action issued by the State Intellectual Property Office dated Nov. 23, 2018, which corresponds to Chinese Patent Application No. 201710189104.5 and is related to U.S. Appl. No. 15/456,742.

* cited by examiner

LASER CUTTING APPARATUS THAT PERFORMS GAP SENSOR CALIBRATION AND REFLECTED LIGHT PROFILE MEASUREMENT, AND CORRELATION TABLE GENERATION METHOD FOR LASER CUTTING APPARATUS

This application is based on and claims the benefit of priority from Japanese Patent Application No. 2016-066592, filed on 29 Mar. 2016, the content of which is incorporated herein by reference.

BACKGROUND OF THE INVENTION

Field of the Invention

The present invention relates to a laser cutting apparatus and a correlation table generation method for the laser cutting apparatus; in particular, the present invention relates to a laser cutting apparatus that performs gap sensor calibration and reflected light profile measurement, and a correlation table generation method for the laser cutting apparatus.

Related Art

Conventional laser cutting apparatuses perform processing, while maintaining a constant gap by measuring a distance between a cutting head and a processing object by way of a gap sensor or the like during the processing. The gap sensor outputs a voltage (or current) corresponding to the gap (distance) from the processing object; however, the relationship between the gap and the voltage may not be a proportional relationship in some cases. Therefore, it is required to perform an operation to check the characteristics of the sensor, while moving the cutting head in a vertical direction in relation to the actual processing object. Such a calibration operation for the sensor is required each time the processing object is replaced.

Further, when laser processing is performed on a processing object (in most cases, metal), a laser beam reflected from the processing object may enter a laser oscillator, and may damage the laser oscillator. In order to prevent such damage, a technique is adopted, in which a sensor for monitoring reflected light is provided inside the laser oscillator, and when the reflected light exceeds a constant value, an alarm is provided, and the laser oscillation is stopped. However, when this technique alone is used, the laser cutting apparatus may frequently stop upon activation of an alarm; therefore, this technique is used in combination with a processing method so as to keep the reflected light intensity low. In addition, since the reflected light intensity depends on the processing object, if the reflected light intensity from the actual processing object is measured in advance before processing, the processing can be performed under the condition that the reflected light intensity is low. However, this measurement is also required each time the processing object is replaced.

As technical documents relating to a laser cutting apparatus, for example, Patent Documents 1 and 2 are available. In the laser cutting apparatus of Patent Document 1, in order to improve the capability of controlling the torch position, the torch tip is firstly positioned to a plurality of known predetermined distances from the processing surface. At this time, the laser cutting apparatus reads each output value of the gap sensor, and stores a predetermined distance and a corresponding sensor output value. Subsequently, the laser cutting apparatus obtains a function to approximate the relationship between the predetermined distance and the sensor output value, based on a quadratic or higher polynomial function or exponential function. In addition, when the processing material is processed, the laser cutting apparatus obtains a distance between the torch tip and the work surface, based on the sensor output value according to the function obtained, and controls the position of the torch in accordance with the distance.

Moreover, Patent Document 2 aims to provide a laser cutting apparatus capable of laser-processing a mold down to a minimum thickness without damaging an IC, and discloses an apparatus for laser-processing a processing object that is a composite material composed of a plurality of materials having different laser beam reflectance. This laser cutting apparatus emits a processing laser beam for processing the processing object, and a measuring laser beam for irradiating the processing object, in which the measuring laser beam has a smaller output than the processing laser beam. Further, the laser cutting apparatus measures a reflected light level of the measuring laser beam reflected from the processing object, detects a processing state of the processing object, based on the reflected light level, and detects a position that needs to be processed.

Patent Document 1: Japanese Patent No. 3520631
Patent Document 2: Japanese Patent No. 5142252

SUMMARY OF THE INVENTION

However, the time required for the above-described operations to check the characteristics of the sensor, calibrate the sensor, and measure the reflected intensity, causes a problem of reducing the operating rate of the laser cutting apparatus. It is important that a laser cutting apparatus should perform a lot of processing in a short time; and how to achieve a high operating rate is the key to a competitive edge.

An object of the present invention is to provide a laser cutting apparatus as well as a correlation table generation method for the laser cutting apparatus, which are capable of simultaneously performing gap sensor calibration and reflected light profile measurement.

(1) A laser cutting apparatus according to a first aspect of the present invention is a laser cutting apparatus including: a laser oscillator (e.g. laser oscillator 20 to be described later) configured to generate a laser beam; an output control unit (e.g. output control unit 103 to be described later) configured to control an output of the laser beam; a cutting head (e.g., cutting head 40 to be described later) configured to emit the laser beam to a processing object (e.g., processing object 60 to be described later); a gap sensor (e.g. gap sensor 50 to be described later) configured to detect a distance between the cutting head and the processing object; an axial mechanism (e.g. axial mechanism 30 to be described later) configured to activate the cutting head; an axial control unit (e.g. axial control unit 102 to be described later) configured to instruct the axial mechanism to operate; a detection unit (e.g. detection unit 201 to be described later) configured to detect intensity of a laser beam that is reflected from the processing object and returned to the laser oscillator; a storage unit (e.g. storage unit 104 to be described later) configured to store an output value of the laser beam from the output control unit, reflected light intensity detected by way of the detection unit, a detection value of the gap sensor, and positional information of the axial mechanism; and a correlation table generation unit (e.g. correlation table generation unit 101 to be described later)

configured to output an instruction to operate the axial mechanism while causing the laser oscillator to output a laser beam, to the axial control unit and the output control unit, and configured to generate a correlation table for obtaining a correlation between the output value of the laser beam and the reflected light intensity, a correlation between the positional information and the reflected light intensity, and a correlation between the detection value and the positional information, based on the output value of the laser beam, the reflected light intensity, the detection value, and the positional information.

(2) A laser cutting apparatus according to a second aspect of the present invention is a laser cutting apparatus, including: a laser oscillator (e.g. laser oscillator 20 to be described later) configured to a laser beam; an output control unit (e.g. output control unit 103 to be described later) configured to control an output of the laser beam; a cutting head (e.g., cutting head 40 to be described later) configured to emit the laser beam to a processing object (e.g., processing object 60 to be described later); a gap sensor (e.g. gap sensor 50 to be described later) configured to detect a distance between the cutting head and the processing object; an axial mechanism (e.g. axial mechanism 30 to be described later) configured to activate the cutting head; an axial control unit (e.g. axial control unit 102 to be described later) configured to instruct the axial mechanism to operate; a detection unit (e.g. detection unit 201 to be described later) configured to detect intensity of a laser beam that is reflected from the processing object and returned to the laser oscillator; a storage unit configured to store reflected light intensity detected by way of the detection unit, a detection value of the gap sensor, and positional information of the axial mechanism; and a correlation table generation unit configured to output an instruction to continuously operate the axial mechanism while causing the laser oscillator to output a laser beam at a constant laser beam output, to the axial control unit and the output control unit, and generates a correlation table for obtaining a correlation between the positional information and the reflected light intensity, and a correlation between the detection value and the positional information, based on the reflected light intensity, the detection value, and the positional information.

(3) In a third aspect according the first or second aspect of the present invention, when the correlation table generation unit controls the axial control unit to move the cutting head, while controlling the output control unit to cause the laser oscillator to output a laser beam, the correlation table generation unit may operate the axial mechanism in synchronization with a vertical direction and a horizontal direction in relation to the processing object.

(4) In a fourth aspect according to the first or third aspect of the present invention, when the correlation table generation unit controls the axial control unit to move the cutting head, while controlling the output control unit to cause the laser oscillator to output a laser beam, the correlation table generation unit may operate the axial mechanism in a stepwise manner, and may change a laser output in each step.

(5) A correlation table generation method for a laser cutting apparatus according to a fifth aspect of the present invention is a correlation table generation method for a laser cutting apparatus (e.g. laser cutting apparatus 1 to be described later), in which the method includes: while, based on an instruction, a laser oscillator (e.g. laser oscillator 20 to be described later) outputs a laser beam, and a cutting head (e.g. cutting head 40 to be described later) emits the laser beam to a processing object (e.g. processing object 60 to be described later), and an axial mechanism (e.g. axial mecha- nism 30 to be described later) is operated to activate the cutting head, detecting a distance between the cutting head and the processing object by way of a gap sensor (e.g. gap sensor 50 to be described later), and detecting, by way of a detection unit (e.g. detection unit 201 to be described later), intensity of a laser beam that is reflected from the processing object and returned to the laser oscillator; storing, in a storage unit (e.g. storage unit 104 to be described later), an output value of the laser beam, reflected light intensity detected by way of the detection unit, a detection value of the gap sensor, and positional information of the axial mechanism; and generating a correlation table for obtaining a correlation between the output value of the laser beam and the reflected light intensity, a correlation between the positional information and the reflected light intensity, and a correlation between the detection value and the positional information, based on the output value of the laser beam, the reflected light intensity, the detection value, and the positional information.

(6) A correlation table generation method for a laser cutting apparatus according to a sixth aspect of the present invention is a correlation table generation method for a laser cutting apparatus, in which the method includes: while, based on an instruction, a laser oscillator (e.g. laser oscillator 20 to be described later) outputs a laser beam at a constant output, and a cutting head (e.g. cutting head 40 to be described later) emits the laser beam to a processing object (e.g. processing object 60 to be described later), and an axial mechanism (e.g. axial mechanism 30 to be described later) is operated to activate the cutting head, detecting a distance between the cutting head and the processing object by way of a gap sensor (e.g. gap sensor 50 to be described later), and detecting, by way of a detection unit (e.g. detection unit 201 to be described later), intensity of a laser beam that is reflected from the processing object and returned to the laser oscillator; storing, in a storage unit, reflected light intensity detected by way of the detection unit, a detection value of the gap sensor, and positional information of the axial mechanism; and generating a correlation table for obtaining a correlation between the positional information and the reflected light intensity, and a correlation between the detection value and the positional information, based on the reflected light intensity, the detection value, and the positional information.

The present invention can simultaneously perform gap sensor calibration and reflected light profile measurement, and improve an operating rate of a laser cutting apparatus.

DETAILED DESCRIPTION OF THE INVENTION

Embodiments of the present invention are hereinafter described with reference to the drawings.

First Embodiment

Figure 1:
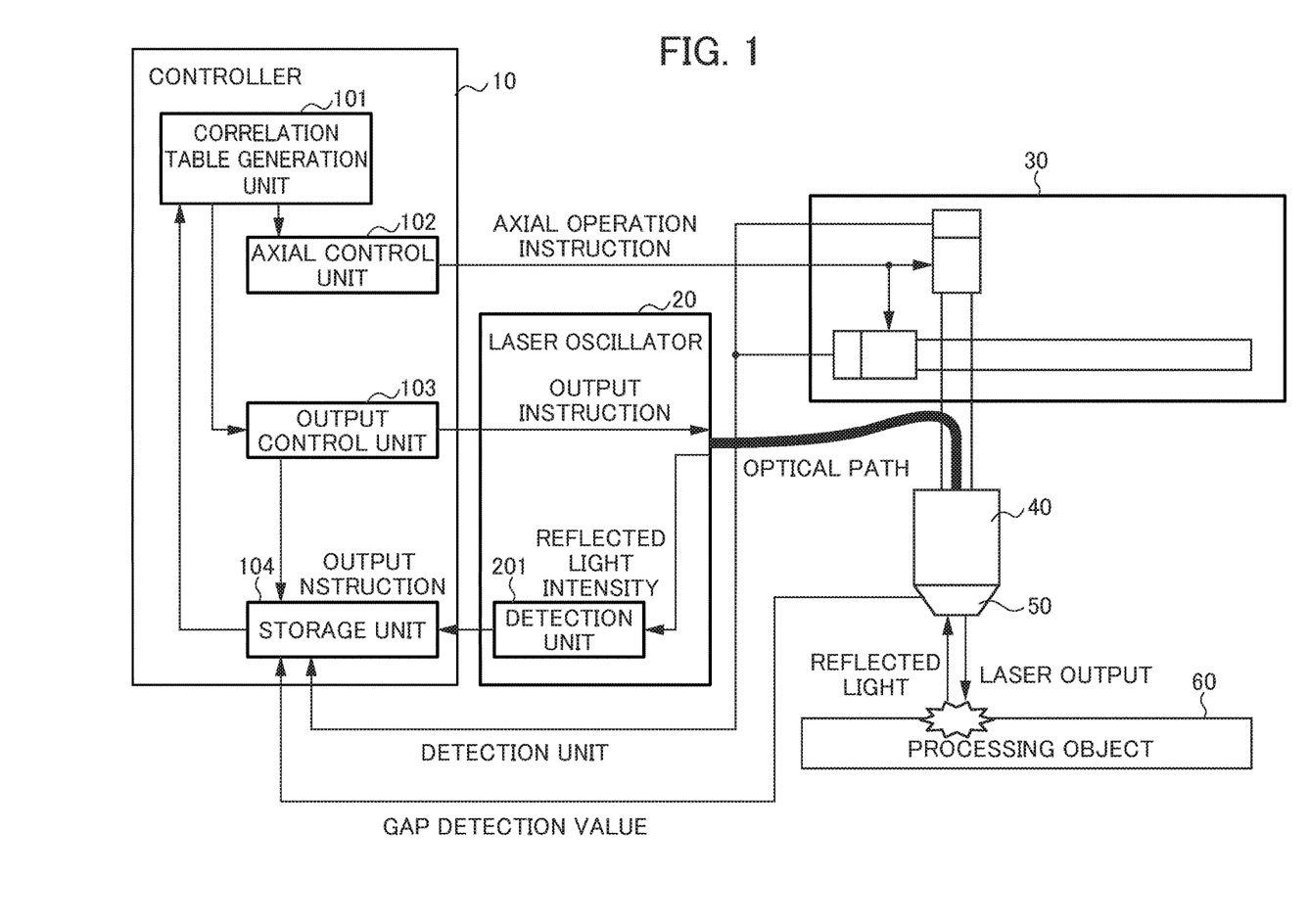
FIG. 1 is a schematic configuration diagram of a laser cutting apparatus of one embodiment of the present invention.

FIG. 1 is a schematic configuration diagram of a laser cutting apparatus of one embodiment of the present invention. As illustrated in FIG. 1, the laser cutting apparatus includes a controller 10, a laser oscillator 20, an axial mechanism 30, a cutting head 40, and a gap sensor 50. The laser oscillator 20 generates a laser beam, and supplies the laser beam to the cutting head 40 via an optical path. A processing object 60 is processed with a beam-like laser beam emitted from the cutting head 40. The axial mechanism 30 activates the cutting head 40 in a horizontal direction (X-axis and Y-axis directions) and a vertical direction (Z-axis direction). The gap sensor 50 is attached to a tip portion of the cutting head 40, moves together with the cutting head 40, and detects a distance between the tip portion of the cutting head 40 and a surface of the processing object 60.

The controller 10 includes: a correlation table generation unit 101; an axial control unit 102 that instructs the axial mechanism 30 to operate; an output control unit 103 that outputs an instruction for the laser oscillator 20 to control the output of a laser beam; and a storage unit 104. The laser oscillator 20 includes a detection unit 201 that detects intensity (reflected light intensity) of a laser beam that is reflected from the processing object 60 and returned to the laser oscillator 20. Since the reflected light returning to the laser oscillator 20 may damage the laser oscillator 20, the detection unit 201 measures the reflected light intensity in order to obtain allowable reflected light intensity.

When the detection unit 201 measures the reflected light, the output control unit 103 outputs laser output instructions in a consecutive way (CW) or a pulsed way (PW). When the output control unit 103 outputs the laser output instructions in a pulsed way, there is an effect to reduce the cumulative damages to the laser oscillator 20 due to reflected light.

While the laser oscillator 20 outputs a laser beam, the correlation table generation unit 101 outputs instructions to the axial control unit 102 and the output control unit 103, respectively, in accordance with a single trigger, in order to operate the axial mechanism 30. Here, a trigger generation unit (not illustrated) generates a single trigger at predetermined timing at a preliminary stage before processing.

The storage unit 104 stores: an output value of a laser beam (beam output intensity) that is output from the output control unit 103; reflected light intensity detected by way of the detection unit 201; a detection value of the gap sensor 50; and positional information of the axial mechanism 30. The correlation table generation unit 101 reads the output value of the laser beam, the reflected light intensity, the detection value, and the positional information stored in the storage unit 104, and generates a correlation table for obtaining a correlation between the output value of the laser beam and the reflected light intensity, a correlation between the positional information and the reflected light intensity, and a correlation between the detection value and the positional information.

Table 1 illustrates an example of the correlation table generated by way of the correlation table generation unit 101. In Table 1, distances $z_1$ to $z_m$ from the work surface represent the positional information of the axial mechanism, in which the distance $z_1$ represents the distance from the work surface when the cutting head 40 rises one step, and the distance $z_m$ represents the distance from the work surface when the cutting head 40 finishes the rising operation.

TABLE 1

| DISTANCE $z_1$ FROM WORK SURFACE | BEAM OUTPUT INTENSITY | $p_1$ | $p_2$ | ... $p_n$ |
|---|---|---|---|---|
| | REFLECTED LIGHT INTENSITY | $i_{11}$ | $i_{12}$ | ... $i_{1n}$ |
| | GAP SENSOR DETECTION VALUE | $s_1$ | $s_1$ | ... $s_1$ |
| DISTANCE $z_2$ FROM WORK SURFACE | BEAM OUTPUT INTENSITY | $p_1$ | $p_2$ | ... $p_n$ |
| | REFLECTED LIGHT INTENSITY | $i_{21}$ | $i_{22}$ | ... $i_{2n}$ |
| | GAP SENSOR DETECTION VALUE | $s_2$ | $s_2$ | ... $s_2$ |
| ... | ... | ... | ... | ... |
| DISTANCE $z_m$ FROM WORK SURFACE | BEAM OUTPUT INTENSITY | $p_1$ | $p_2$ | ... $p_n$ |
| | REFLECTED LIGHT INTENSITY | $i_{m1}$ | $i_{m2}$ | ... $i_{mn}$ |
| | GAP SENSOR DETECTION VALUE | $s_m$ | $s_m$ | ... $s_m$ |

Based on an instruction to output a laser beam from the laser oscillator 20, and an instruction to operate the axial mechanism 30, the correlation table generation unit 101 can obtain an output value of the laser beam, reflected light intensity detected by way of the detection unit 201, a detection value of the gap sensor 50, and positional information of the axial mechanism 30. This allows for simultaneously performing gap sensor calibration as a preliminary operation before processing, and profile measurement for predicting reflected light to be generated during the processing. Therefore, the operating rate of the laser cutting apparatus can be improved.

In order to generate a correlation table, it is required to operate the axial mechanism 30, while changing the output of a laser beam of the laser oscillator 20. A control method thereof and a correlation obtained from the correlation table generation unit 101 are described with reference to the flowchart in FIG. 2 and the diagrams in FIGS. 3A to 3E.

Figure 2:
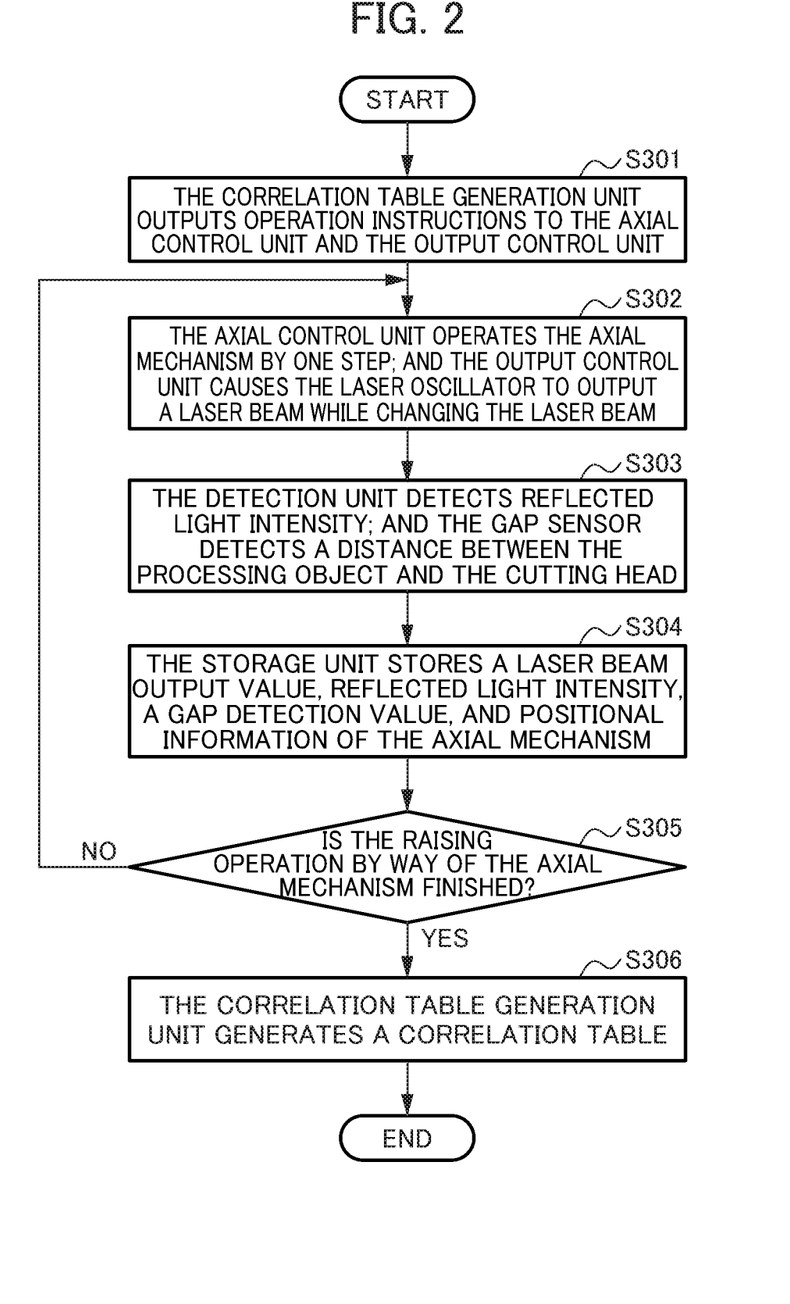
FIG. 2 is a flowchart illustrating an operation of a laser cutting apparatus in a first embodiment.

Firstly, the correlation table generation unit 101 outputs an instruction to output a laser beam from the laser oscillator 20, and an instruction to operate the axial mechanism 30, to the axial control unit 102 and the output control unit 103 (Step S301). The axial control unit 102 causes the axial mechanism 30 to raise the cutting head 40 one step, to which the gap sensor 50 is attached, above the work surface of the processing object 60. For example, the axial control unit 102 raises the cutting head 40 to a distance $z_1$ from the work surface (the distance $z_1$ is positional information of the axial mechanism). In addition, when the cutting head is stopped, the axial control unit 102 causes a laser beam to be emitted to the processing object 60, while the output control unit 103 changes the output of the laser beam of the laser oscillator 20 (Step S302).

Subsequently, the detection unit 201 detects intensity (reflected light intensity) of a laser beam that is reflected from the processing object 60 and returned to the laser oscillator 20; and the gap sensor 50 detects a distance between the tip portion of the cutting head 40 and the surface of the processing object 60 (Step S303). Then, the storage unit 104 stores: an output value of a laser beam that is output from the output control unit 103; reflected light intensity detected by way of the detection unit 201; a detection value of the gap sensor 50; and positional information of the axial mechanism 30 (Step S304).

Subsequently, the correlation table generation unit 101 determines whether the rising operation of the cutting head by way of the axial mechanism 30 is finished (Step S305); and if the operation is not finished (NO in Step S305), the processing returns to Step S302, and the axial control unit 102, the detection unit 201, the storage unit 104, and the correlation table generation unit 101 perform the operations from Step S302 to S304. The operations from Step S302 to Step S305 are repeated until the rising operation by way of the axial mechanism 30 is finished. When the rising operation is finished (YES in Step S305), the correlation table generation unit 101 reads an output value of the laser beam (beam output intensity), reflected light intensity, a detection value of the gap sensor, and positional information of the axial mechanism, from the storage unit 104, and generates a correlation table; and the present processing ends.

In this manner, in the present embodiment, the correlation table generation unit 101 stops the cutting head 40 and changes the output of the laser beam in each step, thereby making it possible to obtain an output value of the laser beam (beam output intensity), reflected light intensity, a detection value of the gap sensor, and positional information of the axial mechanism, in each step from the work surface. Therefore, by generating a correlation table, the correlation table generation unit 101 can obtain a correlation between the output value of the laser beam and the reflected light intensity, a correlation between the positional information and the reflected light intensity, and a correlation between the detection value and the positional information.

Note that a detection value of the gap sensor and positional information of the axial mechanism can be obtained regardless of the output of the laser beam; therefore, a detection value of the gap sensor and positional information of the axial mechanism can be detected in a continuous manner as well, instead of a stepwise manner. In the flowchart illustrated in FIG. 2, after raising the cutting head 40 one step and stopping the cutting head 40, the output of the laser beam is changed, and an output value of a laser beam (beam output intensity), reflected light intensity, a detection value of the gap sensor, and positional information of the axial mechanism are obtained; however, the output value of the laser beam (beam output intensity), reflected light intensity, a detection value of the gap sensor, and positional information of the axial mechanism may be obtained by changing the output of the laser beam at a position in a stand-by state before raising the head 40 one step.

Figure 3A:
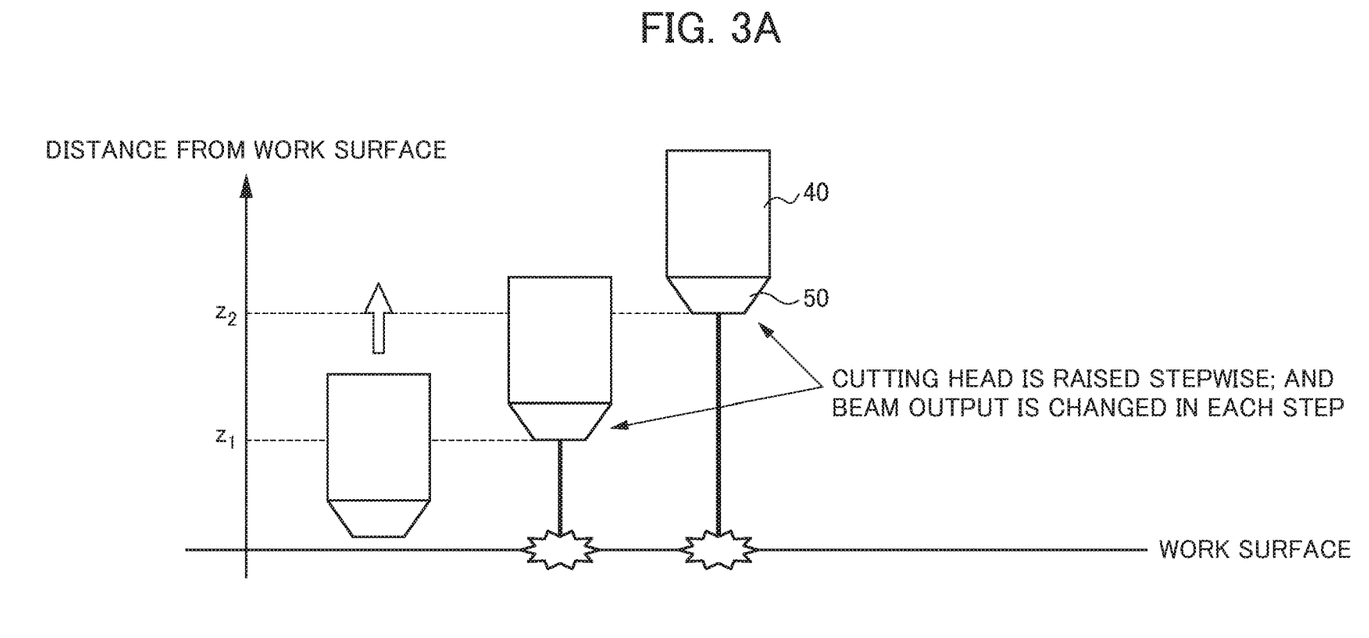
FIG. 3A is a diagram illustrating states where a cutting head is raised stepwise, and stopped at a position in a distance $z_1$, and a position in a distance $z_2$, from a work surface.

FIG. 3A illustrates the states where the cutting head 40 is raised stepwise, and stopped at a position in a distance $z_1$, and a position in a distance $z_2$, from the work surface. The distances $z_1$ and $z_2$ from the work surface are positional information of the axial mechanism. FIGS. 3B to 3E are characteristic graphs illustrating a correlation between the output value of the laser beam and the reflected light intensity, a correlation between the positional information and the reflected light intensity, and a correlation between the detection value and the positional information, which are obtained from the correlation table of Table 1.

Figure 3B:
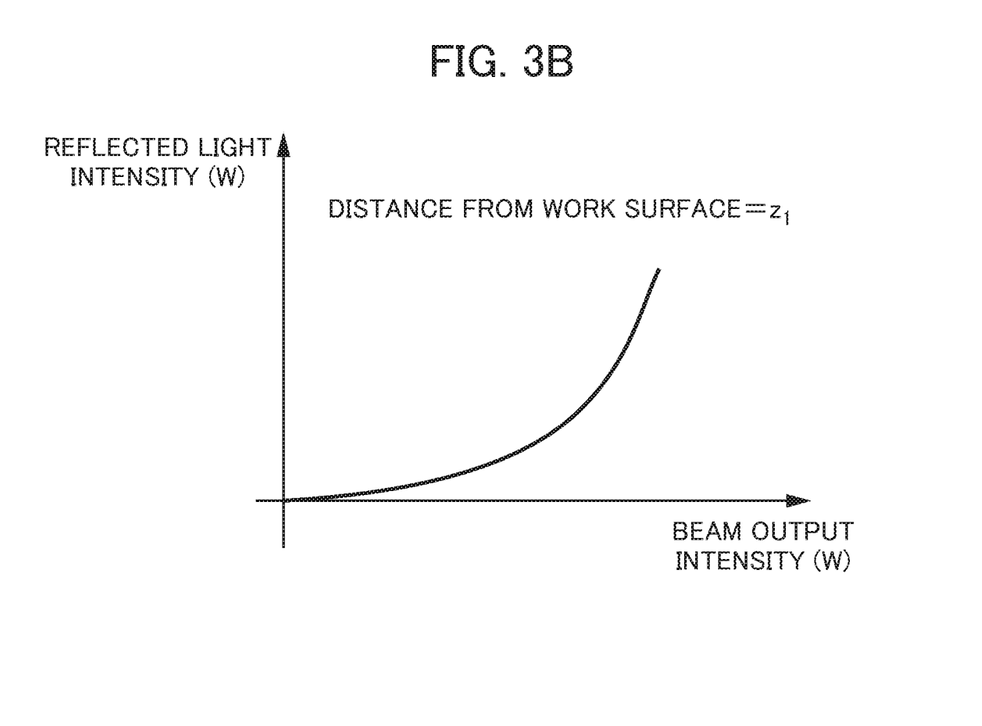
FIG. 3B is a characteristic graph illustrating a correlation between beam output intensity (W) and reflected light intensity (W), in the case where the cutting head is stopped at the position in the distance $z_1$, an output of a laser beam of a laser oscillator is changed, and the reflected light intensity is measured by way of a detection unit.
Figure 3C:
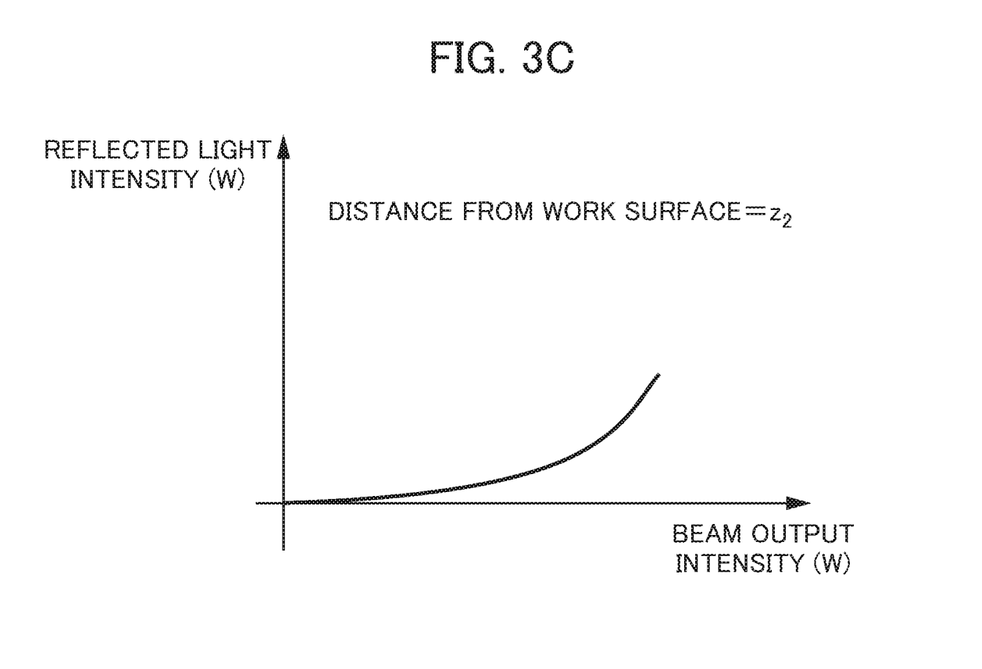
FIG. 3C is a characteristic graph illustrating a correlation between beam output intensity (W) and reflected light intensity (W), in the case where the cutting head is stopped at the position in the distance $z_2$, an output of a laser beam of the laser oscillator is changed, and the reflected light intensity is measured by way of the detection unit.

FIGS. 3B and 3C are characteristic graphs illustrating a correlation between the beam output intensity (W) and the reflected light intensity (W), in the case where the cutting head 40 is stopped at the position in the distance $z_1$ and the position in the distance $z_2$, the output of the laser beam of the laser oscillator 20 is changed, and the reflected light intensity is measured by way of the detection unit 201. The width of one step of raising the cutting head 40 (corresponding to distance $z_2$ -distance $z_1$) can be arbitrarily set up; and if the accuracy of detection is desired to be higher, the width of one step may be set up smaller.

Figure 3D:
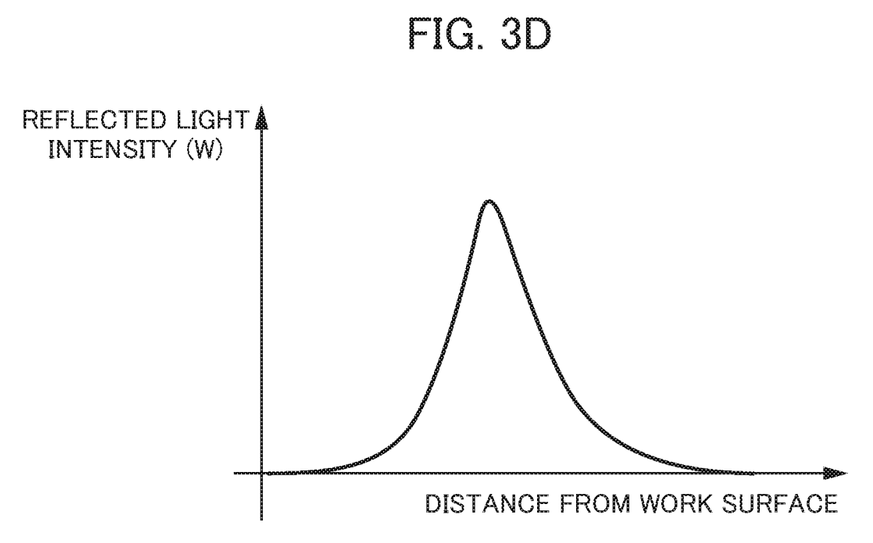
FIG. 3D is a characteristic graph illustrating a correlation between a distance from the work surface and reflected light intensity, in which the correlation is obtained from a correlation table of Table 1.
Figure 3E:
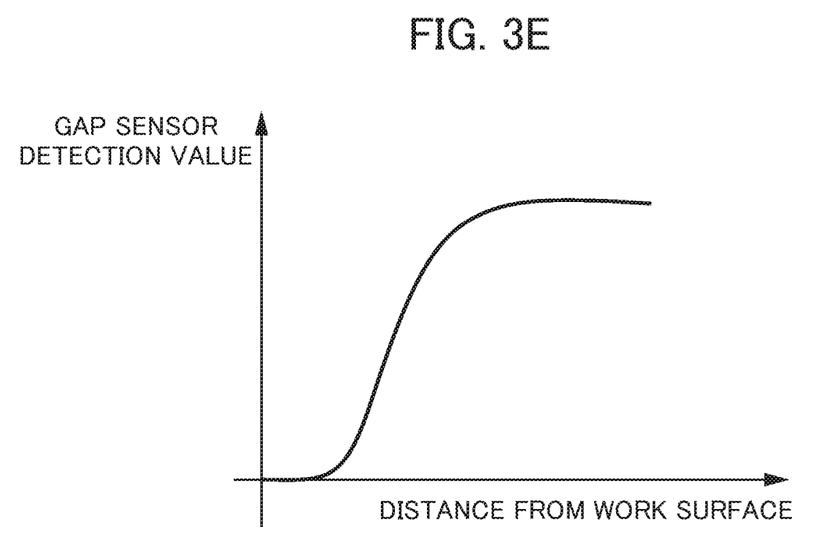
FIG. 3E is a characteristic graph illustrating a correlation between a distance from the work surface and a detection value of the gap sensor, in which the correlation is obtained from the correlation table of Table 1.

FIG. 3D is a characteristic graph illustrating a correlation between a distance from the work surface and reflected light intensity, at a certain output value of the laser beam, in the case where the cutting head 40 is raised stepwise. Note that, since the output of the laser beam is changed, the characteristic graph such as that in FIG. 3D is obtained for each output value of the laser beam. FIG. 3E is a characteristic graph illustrating a correlation between a distance from the work surface and a detection value of the gap sensor, in the case where the cutting head 40 is raised stepwise.

In this manner, the correlation table generation unit 101 raises the cutting head 40 stepwise, to which the gap sensor 50 is attached, and changes the output of the laser beam in each step, above the work surface of the processing object 60. As a result, the use of the correlation table of Table 1 allows for obtaining three correlations: a correlation between the output value of the laser beam and the reflected light intensity, a correlation between the positional information and the reflected light intensity, and a correlation between the detection value and the positional information.

Second Embodiment

In the first embodiment, the correlation table generation unit 101 obtains three correlations: a correlation between the output value of the laser beam and the reflected light intensity, a correlation between the positional information and the reflected light intensity, and a correlation between the detection value and the positional information. In contrast, in the present embodiment, the correlation table generation unit 101 maintains the laser output at a constant level, continuously raises the cutting head 40, to which the gap sensor 50 is attached, and obtains a correlation between positional information of the axial mechanism and reflected light intensity, and a correlation between a detection value of the gap sensor and positional information of the axial mechanism.

The configuration of the laser cutting apparatus used in the present embodiment is the same as the configuration of the laser cutting apparatus illustrated in FIG. 1. The present embodiment differs from the first embodiment in operations, in which the correlation table generation unit 101 controls the output control unit 103 to maintain the laser output at a constant level, and controls the axial control unit 102 to continuously move the cutting head 40. In the present embodiment, the correlation table generation unit 101 sets up the laser output at a lower level, and prevents the peak of reflected light intensity from exceeding a constant value, even if the cutting head 40 is continuously moved.

Figure 4:
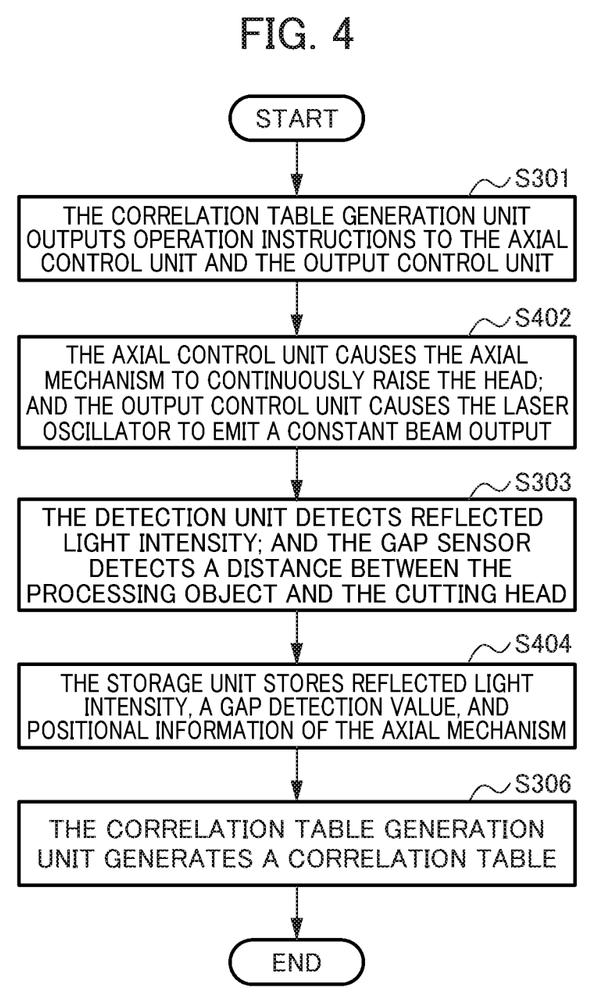
FIG. 4 is a flowchart illustrating an operation of a laser cutting apparatus in a second embodiment.

In the flowchart illustrating the operations of the laser cutting apparatus in the present embodiment illustrated in FIG. 4, Step S302 is replaced with Step S402, and Step S304 is replaced with Step S404, which are the difference from the flowchart illustrated in FIG. 3. Specifically, in Step S402, the axial control unit 102 causes the axial mechanism 30 to continuously raise the cutting head 40, and the output control unit 103 causes the laser oscillator 20 to continuously emit a constant beam output, which are the difference from Step S302 of FIG. 3. Further, in Step S404, the storage unit 104 does not store an output value of a laser beam, which is the difference from Step S304 of FIG. 3.

Table 2 illustrates an example of the correlation table generated by way of the correlation table generation unit 101. In Table 1, the distance $z_1$ represents the distance from the work surface when the cutting head 40 starts a rising operation, and the distance $z_m$ represents the distance from the work surface when the cutting head 40 finishes the rising operation.

TABLE 2

| DISTANCE $z_1$ FROM WORK SURFACE | REFLECTED LIGHT INTENSITY | $i_{12}$ |
|---|---|---|
| | GAP SENSOR DETECTION VALUE | $s_1$ |
| ... | ... | ... |
| DISTANCE $z_m$ FROM WORK SURFACE | REFLECTED LIGHT INTENSITY | $i_{m2}$ |
| | GAP SENSOR DETECTION VALUE | $s_m$ |

Figure 5A:
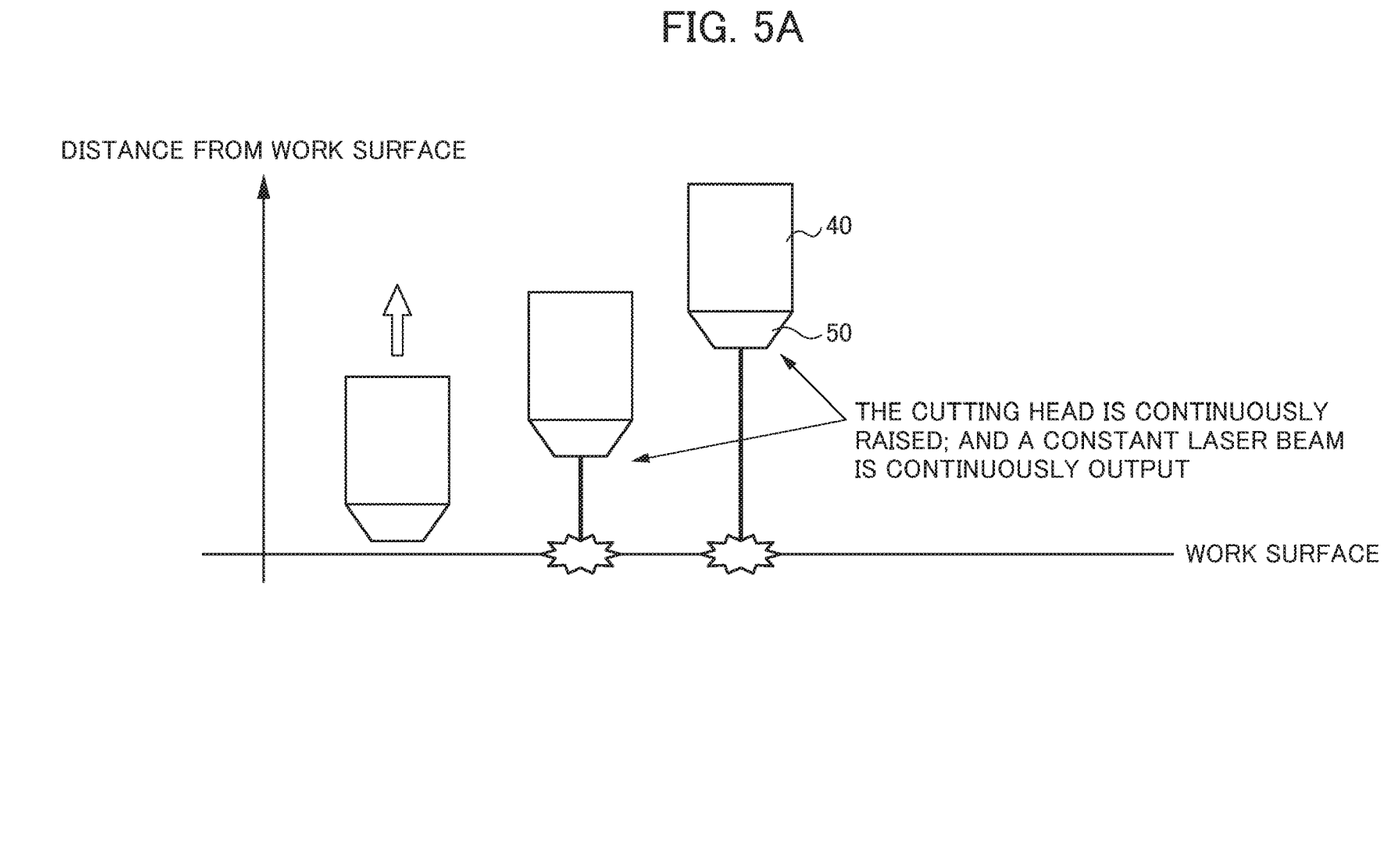
FIG. 5A is a diagram illustrating states where the cutting head is continuously raised from the work surface, and the laser oscillator continuously outputs a constant laser beam.
Figure 5B:
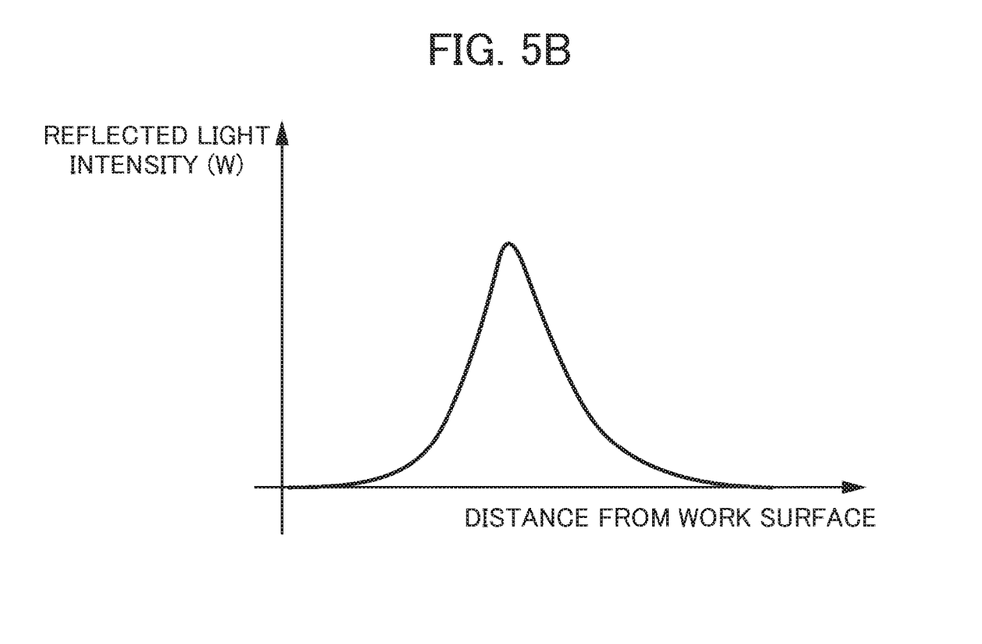
FIG. 5B is a characteristic graph illustrating a correlation between a distance from the work surface and reflected light intensity, in which the correlation is obtained from the correlation table of Table 2.
Figure 5C:
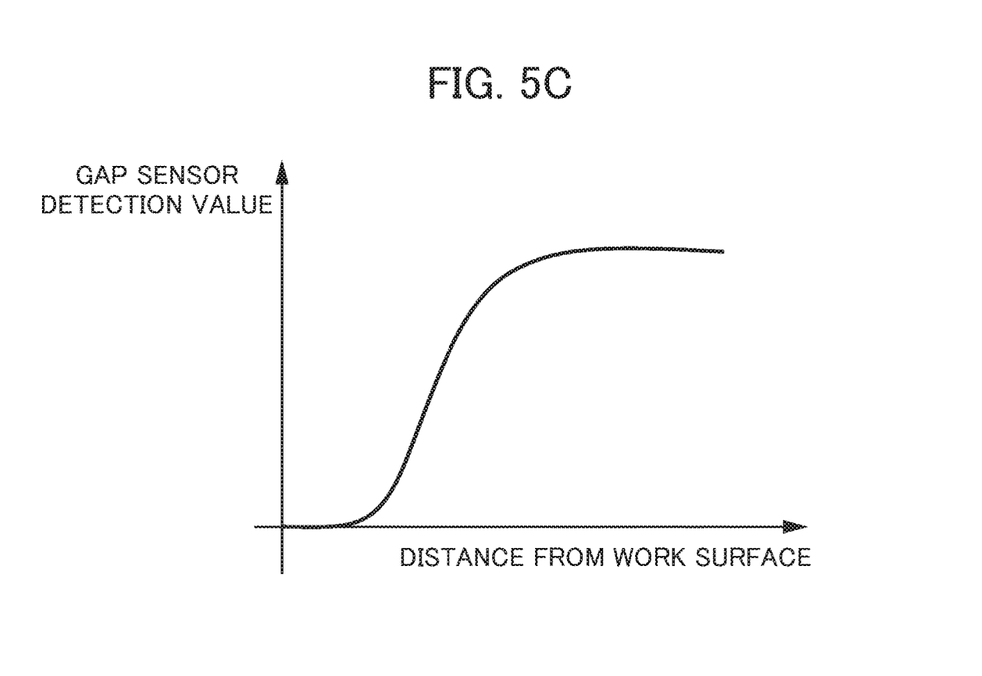
FIG. 5C is a characteristic graph illustrating a correlation between a distance from the work surface and a detection value of the gap sensor, in which the correlation is obtained from the correlation table of Table 2.

FIG. 5A is a diagram illustrating the states where the correlation table generation unit 101 causes the cutting head 40 to continuously rise from the position in the distance $z_1$ from the work surface, and causes the laser oscillator 20 to continuously output a constant laser beam. FIG. 5B is a characteristic graph illustrating a correlation between a distance from the work surface and reflected light intensity, in which the correlation is obtained from the correlation table of Table 2. FIG. 5C is a characteristic graph illustrating a correlation between a distance from the work surface and a detection value of the gap sensor, in which the correlation is obtained from the correlation table of Table 2. The distance from the work surface is positional information of the axial mechanism.

In the present embodiment, since the correlation table generation unit 101 does not detect a correlation between the output value of the laser beam and the reflected light intensity, the time required for detecting a correlation can be shortened. Note that, in the present embodiment, if a correlation between the output value of the laser beam and the reflected light intensity is desired to be detected, while changing the output of the laser beam, the correlation table generation unit 101 may change the output of the laser beam, and repeat Steps S301, S402, S303 and S404 of FIG. 4, correspondingly to such changes.

In the first and second embodiments described above, when the cutting head is moved while outputting a laser beam, the correlation table generation unit 101 can control the axial control unit 102, such that the cutting head 40 is operated in synchronization with the vertical direction and the horizontal direction in relation to the processing object 60 (the cutting head is diagonally moved). Since the correlation table generation unit 101 operates the cutting head 40 in this manner, if the surface of the processing object 60 changes in quality by receiving the laser beam, the position can be changed in the horizontal direction, such that the detected information will not be affected by the change.

In the first and second embodiments, when the cutting head 40 is moved while outputting a laser beam, the correlation table generation unit 101 can control the axial control unit 102, such that the cutting head 40 is operated only in the vertical direction in relation to the processing object 60. This is because, when the instructed laser output is small, a change in quality of the surface of the processing object can be ignored, and a horizontal movement may not be required in some cases. By operating the cutting head 40 only in the vertical direction in relation to the processing object 60, the range of trial shooting of a laser beam can be narrower, and the waste of materials will be reduced.

The controller 10 of the laser cutting apparatus of the embodiments described above can be implemented by hardware, software or a combination thereof. Herein, the implementation by software means implementation by a computer that reads and executes a program. When configured with hardware, part or all of the controller 10 illustrated in FIG. 1 can be configured with, for example, an integrated circuit (IC) such as LSI (Large Scale Integrated Circuit), ASIC (Application Specific Integrated Circuit), gate array, and FPGA (Field Programmable Gate Array).

In the case in which all or part of the controller 10 is configured with software, a computer is configured with: a storage unit such as a hard disk and ROM which store a program describing all or part of the operations in Steps S301, S302, S304, S305 and S306 illustrated in the flowchart of FIG. 2, or the operations in Steps S301, S402, S404 and S306 illustrated in the flowchart of FIG. 4; DRAM which store data necessary for computation; CPU; and a bus which connects each unit; in which information necessary for computation is stored in the DRAM, and the program is operated in the CPU, whereby all or part of the functions of the controller 10 can be realized.

A program is stored by using various types of computer-readable media, and can be supplied to a computer. The computer-readable media include various types of tangible storage media. The computer-readable media include a non-transitory computer-readable medium. Examples of the computer-readable media include: a magnetic recording medium (e.g. flexible disk, magnetic tape, hard disk drive), a magneto-optical recording medium (e.g. magneto-optical disk), CD-ROM (Read Only Memory), CD-R, CD-R/W, semiconductor memory (e.g. Mask ROM, PROM (Programmable ROM), EPROM (Erasable PROM), flash ROM, and RAM (random access memory)).

EXPLANATION OF REFERENCE NUMERALS

10: controller
20: laser oscillator
30: axial mechanism
40: cutting head

50: gap sensor
60: processing object
101: correlation table generation unit
102: axial control unit
103: output control unit
104: storage unit
201: detection unit

What is claimed is:

1. A laser cutting apparatus comprising:
a laser oscillator configured to generate a laser beam;
an output control unit configured to control an output of the laser beam;
a cutting head configured to emit the laser beam to a processing object;
a gap sensor configured to detect a distance between the cutting head and the processing object;
an axial mechanism configured to activate the cutting head;
an axial control unit configured to instruct the axial mechanism to operate;
a detection unit configured to detect intensity of a laser beam that is reflected from the processing object and returned to the laser oscillator;
a storage unit configured to store an output value of the laser beam from the output control unit, reflected light intensity detected by way of the detection unit, a detection value of the gap sensor, and positional information of the axial mechanism; and
a correlation table generation unit configured to output an instruction to operate the axial mechanism while causing the laser oscillator to output the laser beam, to the axial control unit and the output control unit, and configured to generate a correlation table for obtaining a correlation between the output value of the laser beam and the reflected light intensity, a correlation between the positional information and the reflected light intensity, and a correlation between the detection value of the gap sensor and the positional information, based on the output value of the laser beam, the reflected light intensity, the detection value of the gap sensor, and the positional information.

2. The laser cutting apparatus according to claim 1, wherein
when the correlation table generation unit controls the axial control unit to move the cutting head, while controlling the output control unit to cause the laser oscillator to output a laser beam, the correlation table generation unit operates the axial mechanism in synchronization with a vertical direction and a horizontal direction in relation to the processing object.

3. The laser cutting apparatus according to claim 1, wherein
when the correlation table generation unit controls the axial control unit to move the cutting head, while controlling the output control unit to cause the laser oscillator to output a laser beam, the correlation table generation unit operates the axial mechanism in a stepwise manner, and changes a laser output in each step.

4. A laser cutting apparatus comprising:
a laser oscillator configured to generate a laser beam;
an output control unit configured to control an output of the laser beam;
a cutting head configured to emit the laser beam to a processing object;
a gap sensor configured to detect a distance between the cutting head and the processing object;
an axial mechanism configured to activate the cutting head;
an axial control unit configured to instruct the axial mechanism to operate;
a detection unit configured to detect intensity of a laser beam that is reflected from the processing object and returned to the laser oscillator;
a storage unit configured to store reflected light intensity detected by way of the detection unit, a detection value of the gap sensor, and positional information of the axial mechanism; and
a correlation table generation unit configured to output an instruction to continuously operate the axial mechanism while causing the laser oscillator to output the laser beam at a constant laser beam output, to the axial control unit and the output control unit, and configured to generate a correlation table for obtaining a correlation between the positional information and the reflected light intensity, and a correlation between the detection value of the gap sensor and the positional information, based on the reflected light intensity, the detection value of the gap sensor, and the positional information.

5. The laser cutting apparatus according to claim 4, wherein
when the correlation table generation unit controls the axial control unit to move the cutting head, while controlling the output control unit to cause the laser oscillator to output a laser beam, the correlation table generation unit operates the axial mechanism in synchronization with a vertical direction and a horizontal direction in relation to the processing object.

6. A correlation table generation method for a laser cutting apparatus, the method comprising:
while, based on an instruction, a laser oscillator outputs a laser beam and a cutting head emits the laser beam to a processing object, and an axial mechanism is operated to activate the cutting head, detecting a distance between the cutting head and the processing object by way of a gap sensor, and detecting, by way of a detection unit, intensity of a laser beam that is reflected from the processing object and returned to the laser oscillator;
storing, in a storage unit, an output value of the laser beam, reflected light intensity detected by way of the detection unit, a detection value of the gap sensor, and positional information of the axial mechanism; and
generating a correlation table for obtaining a correlation between the output value of the laser beam and the reflected light intensity, a correlation between the positional information and the reflected light intensity, and a correlation between the detection value of the gap sensor and the positional information, based on the output value of the laser beam, the reflected light intensity, the detection value of the gap sensor, and the positional information.

7. A correlation table generation method for a laser cutting apparatus, the method comprising:
while, based on an instruction, a laser oscillator outputs a laser beam at a constant output and a cutting head emits the laser beam to a processing object, and an axial mechanism is operated to activate the cutting head, detecting a distance between the cutting head and the processing object by way of a gap sensor, and detecting, by way of a detection unit, intensity of a laser beam that is reflected from the processing object and returned to the laser oscillator;

storing, in a storage unit, reflected light intensity detected by way of the detection unit, a detection value of the gap sensor, and positional information of the axial mechanism; and generating a correlation table for obtaining a correlation between the positional information and the reflected light intensity, and a correlation between the detection value of the gap sensor and the positional information, based on the reflected light intensity, the detection value of the gap sensor, and the positional information.

* * * * *